US011056680B2

(12) United States Patent
Vissers

(10) Patent No.: US 11,056,680 B2
(45) Date of Patent: Jul. 6, 2021

(54) MOLTEN FLUID ELECTRODE APPARATUS

(71) Applicant: Vissers Battery Corporation, Wheaton, IL (US)

(72) Inventor: Daniel R. Vissers, Wheaton, IL (US)

(73) Assignee: Vissers Battery Corporation, Wheaton, IL (US)

(*) Notice: Subject to any disclaimer, the term of this patent is extended or adjusted under 35 U.S.C. 154(b) by 282 days.

(21) Appl. No.: 15/982,455

(22) Filed: May 17, 2018

(65) Prior Publication Data
US 2019/0355965 A1    Nov. 21, 2019

(51) Int. Cl.
| H01M 10/39 | (2006.01) |
| H01M 4/136 | (2010.01) |
| H01M 4/134 | (2010.01) |
| H01M 4/04 | (2006.01) |
| H01M 4/02 | (2006.01) |

(52) U.S. Cl.
CPC ......... *H01M 4/0471* (2013.01); *H01M 4/134* (2013.01); *H01M 4/136* (2013.01); *H01M 10/39* (2013.01); *H01M 2004/021* (2013.01); *H01M 2004/027* (2013.01); *H01M 2004/028* (2013.01)

(58) Field of Classification Search
CPC .... H01M 4/0471; H01M 4/134; H01M 4/136; H01M 10/39; H01M 2004/021; H01M 2004/027; H01M 2004/028
See application file for complete search history.

(56) References Cited

U.S. PATENT DOCUMENTS

| 3,531,324 A | 9/1970 | Fischer et al. |
| 4,007,315 A | 2/1977 | Brinkmann |
| 4,397,924 A * | 8/1983 | Rea ............... H01M 4/40 29/623.1 |
| 4,584,251 A | 4/1986 | Hunziker |
| 4,913,985 A | 4/1990 | Baer |
| 5,070,933 A | 12/1991 | Baer |
| 5,385,793 A | 1/1995 | Tiedemann |

(Continued)

FOREIGN PATENT DOCUMENTS

| EP | 1723080 B1 | 6/2014 |
| FR | 2934087 | 1/2010 |

(Continued)

OTHER PUBLICATIONS

English translation of JP-2014229591-A relied on by the Examiner (Year: 2014).*

(Continued)

*Primary Examiner* — Christopher P Domone
*Assistant Examiner* — Kimberly Wyluda
(74) *Attorney, Agent, or Firm* — Gavrilovich, Dodd & Lindsey, LLP; Charles D. Gavrilovich, Jr.

(57) ABSTRACT

A battery includes negative electrode material and positive electrode material where the materials are in a solid phase except for selected portions that are heated to transform the selected portions into a fluid. The fluid portion of negative electrode material is directed to a negative electrode region of a reaction chamber and the fluid portion of positive electrode material is directed to a positive electrode region of the reaction chamber where a solid electrolyte containing ions of the negative electrode separates the positive electrode region from the negative electrode region.

28 Claims, 5 Drawing Sheets

(56) References Cited

U.S. PATENT DOCUMENTS

| | | | |
|---|---|---|---|
| 5,534,367 | A | 7/1996 | Kaun |
| 5,569,552 | A | 10/1996 | Rao |
| 5,834,132 | A | 11/1998 | Hasegawa |
| 6,329,096 | B2 | 12/2001 | Kawakami |
| 6,551,740 | B1 | 4/2003 | Melichar |
| 6,683,002 | B1 | 1/2004 | Chooi et al. |
| 8,404,375 | B2 | 3/2013 | Gaben |
| 10,461,311 | B1 * | 10/2019 | Vissers ............... H01M 10/48 |
| 2009/0311603 | A1 | 12/2009 | Visco |
| 2010/0104936 | A1 | 4/2010 | Meintschel |
| 2010/0243017 | A1 | 9/2010 | Normann et al. |
| 2010/0330439 | A1 | 12/2010 | Halbert |
| 2012/0003516 | A1 | 1/2012 | Eisenhour |
| 2012/0171524 | A1 | 7/2012 | Hiraiwa et al. |
| 2013/0122331 | A1 | 5/2013 | McDonald |
| 2015/0226806 | A1 | 8/2015 | Kim et al. |
| 2016/0156062 | A1 | 6/2016 | Littau et al. |
| 2016/0365612 | A1 | 12/2016 | Bradwell et al. |
| 2017/0365853 | A1 | 12/2017 | Visco et al. |

FOREIGN PATENT DOCUMENTS

| | | |
|---|---|---|
| JP | 2014229591 | 12/2014 |
| WO | 20170143088 | 8/2017 |
| WO | 2017147713 | 9/2017 |
| WO | 2017152171 | 9/2017 |

OTHER PUBLICATIONS

Thomas, Shane, International Preliminary Report on Patentability and Written Opinion, PCT/US2019/027339, The International Bureau of WIPO, dated Jul. 5, 2019.

Thomas, Shane, International Preliminary Report on Patentability and Written Opinion, PCT/US2019/027344, The International Bureau of WIPO, dated Jul. 10, 2019.

Thomas, Shane, International Preliminary Report on Patentability and Written Opinion, PCT/US2019/027351, The International Bureau of WIPO, dated Jul. 30, 2019.

Thomas, Shane, International Preliminary Report on Patentability and Written Opinion, PCT/US2019/027354, The International Bureau of WIPO, dated Jun. 27, 2019.

Thomas, Shane, International Preliminary Report on Patentability and Written Opinion, PCT/US2019/027356, The International Bureau of WIPO, dated Jul. 10, 2019.

Thomas, Shane, International Preliminary Report on Patentability and Written Opinion, PCT/US2019/027359, The International Bureau of WIPO, dated Jul. 10, 2019.

Electrochemical Power Sources; Primary & Secondary Batteries; Edited by: M Barak Published by: The Institution of Electrical Engineers, London and New York; Peter Peregrinus Ltd., Stevenage, UK, and New York, ISBN 0-906048-26-5, pp. 318-321.

Molleigh Preefer; MTRL 286G, Spring 2016 "Lithium-Sulfur batteries and discharge products from cycling"; pp. 1-20.

Farday Constant; Wikipedia, https://en.m.wikipedia.org/wiki/Faraday_constant; pp. 1-3.

Kurt J. Lesker Company website; Feedthroughs & Viewports; https://www.lesker.com/newweb/menu_Feedthroughs.cfm?section=liquid&init=skip.

Incell Ceo, Stefan Jansson interview; Smart lithium batteries for Telecom industry; https://www.youtube.com/match?v=FZsiQyqF1rl&feature=youtu.be.

Willmott, A.J. ; http://www.thermopedia.com/content/1832/Regenerative Heat Exchangers; pp. 1-18.

Recuperator; Wikipedia, https://en.wikipedia.org/Rucuperator, pp. 1-4 https://en.wikipedia.org/wiki/.

https://en.wikipedia.org/Regeneratiave_heat_exchanger, pp. 1-4.

Honeywell, "Dielectric Constant Table", www.honeywellprocess.com/library/marketing/tech-specs/Dielectric%20Constant%20Table.pdf, Jun. 6, 2011, p. 45.

https://www.sensormag.com/components/a-dozen-ways-to-measure-fluid-level-and-how-they-work [finish] Hopper, Henry; A Dozen Ways to Measure Fluid-level and How they Work; Sensors Online; Components; pp. 1-11.

https://en.m.wikipedia.org/wiki/Flow_battery; pp. 1-14.

Dow Data Sheet https://msdssearch.dow.com/PublishedLiteratureDOWCOM-dh_0880/0901b80380880bfe.pdf?filepath=/heattrans/pdfs/noreg/176-01435.pdf&frompage=GetDoc (more . . . ) pp. 1-28.

Suberu, Mohammed Yekini, "Energy storage system for renewable energy power sector integration and mitigation of intermittency" Renewable and Sustainable Energy Reviews 35(2014) 499-514; journal homepage: www.elsevier.com/locate/rser.

https://www.hielscher.com/ultrasonically-Homogenizers for Liquid Processing; pp. 1-15.

https://www.hielscher.com/ultrasonically-assisted-catalytic-extraction.htm; pp. 1-8.

http://www.fiberceramics.com/Selee_Corporation_Metal_Foam_Details.php; SELEE Ceramic Foam Filters—World leader in foundry metal filtration and advanced ceramic; pp. 1-5.

https://en.m.wikipedia.org/wiki/Plastic_Extrusion; pp. 1-8.

Greebblatt, Martha; Ionic Conductors; ; Rutgers, The State University of New Jersey USA; pp. 1-34.

Material and Process Selection Charts; CES 2010 EDUPACK; Granta Material Insp; Cambridge University; pp. 1-41.

https://en.m.wiktionary.org/wiki/aliovalent; pp. 1-2.

https://en.m.wikipedia.org/wiki/Crystallographic_defect; pp. 1-7.

https://link.springer.com/article/10.1007/s11581-015-1498-8; Jolley, A., et al.; Improving the ionic conductivity of NASICON through aliovalent cation substitution of Na3Zr2Si2PO12; Ionics (2015) 21:3031-3038.

Liang, C.C., et al., "A High Energy Density Solid-State Battery System"; J. Electrochem. Soc., Electrochemical Science and Technology; Apr. 1976; pp. 453-458.

Liang, C.C.; "Conduction Characteristics of the Lithium Iodide-Aluminum Oxide Solid Electrolytes"; J. Electrochem. Soc., Oct. 1973; pp. 1289-1292.

Rea, J.R. et al., "Development of a Solid-State Secondary Battery System"; Solid State Ionics 3/4 (1981); 267-271.

Okamoto, H.; The Li—S (Lithium-sulfur) System; Asahi University; Journal of Phase Equilibria, vol. 16, No. 1, Feb. 1995, pp. 94-97.

Liang, C.C., et al., "Solid-State Storage Battery System"; J. Applied Electrochemistry; 8 (1978) 445-454.

https://en.m.wikipedia.org/wiki/Molten-salt_battery; pp. 1-5.

https://en.m.wikipedia.org/wiki/Ford Ecostar.

https://en.m.wikipedia.org/wiki/State_diagram; pp. 1-9.

Zhang, Shuo, et al.; "Advanced electrolyte/additive for lithium-ion batteries with silicon anode"; Science Direct; Current Opinion in Chemical Engineering; vol. 13, Aug. 2016; pp. 24-35.

Zhan Lin, et al., "Lithium-Sulfer Batteries: From Liquid to Solid Cells?" Department of Chemical & Biological Engineering, Zhejiang University, Hangzhou, Zhejiang, China; Center for Nanophase Materials Sciences, Oak Ridge National Laboratory, Oak Ridge, TN, USA.

https://authors.library.caltech.edu/5456/1/hrst.mit.edu/hrs/materials/public/Weber&Kummer1967.htm; Weber, Neil et al., Sodium-Sulfur Secondary Battery; Session on Vehicle Propulsion Batteries—Ford Motor Company.

Jolley et al., "Improving Ionic Conductity of NASICON through aliovalent cation substitution of Na3Xr2Si2PO12"; Ionics (2015) 21:3031-3038.

https://en.m.wikipedia.org/wiki/Ionic radius; pp. 1-12.

* cited by examiner

MOLTEN FLUID ELECTRODE APPARATUS

STATEMENT REGARDING FEDERALLY SPONSORED RESEARCH OR DEVELOPMENT

This invention was made with Government support under Contract No. DE-AC02-06CH11357 and awarded by the Department of Energy. The Government has certain rights in the invention.

FIELD

This invention generally relates to thermal batteries and more particularly to methods, devices, and systems with fluid electrodes.

BACKGROUND

A battery generally includes a positive electrode (cathode), a negative electrode (anode) and an electrolyte. A battery typically includes current collectors within the electrodes that direct electrical current to the terminals of the battery. Attempts have been made to use fluids for electrodes where one or both of the electrodes are maintained in a fluid state by heating the electrode material. These batteries are sometimes referred to as thermal batteries or high temperature batteries and include, for example, devices sometimes referred to as liquid-metal batteries and rechargeable liquid-metal batteries. Unfortunately, decades of research and development have not produced a safe and reliable thermal battery using high gravimetric energy density (kWh/kg) electrochemical couples such as, for example, sodium and sulfur or lithium and sulfur.

BRIEF DESCRIPTION OF THE DRAWINGS

It is to be understood that the drawings are solely for purpose of illustration and do not define the limits of the appended claims. Furthermore, the components in the figures are not necessarily to scale. In the figures, like reference numerals designate corresponding parts throughout the different views.

DETAILED DESCRIPTION

Figure 1:
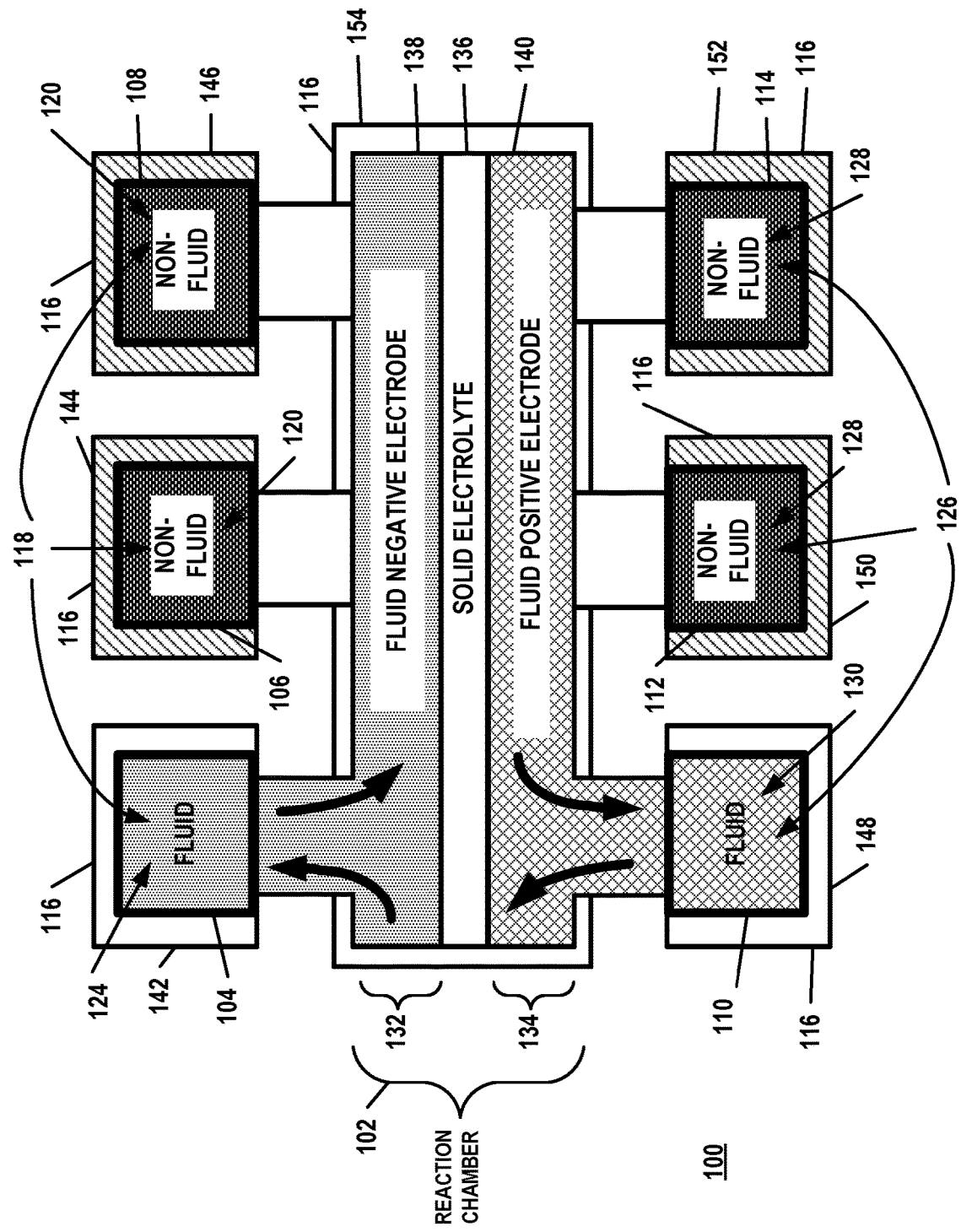
FIG. 1 is a block diagram of an example of a battery including a reaction chamber having fluid electrodes separated by a solid electrolyte where only portions of the electrode materials contained in the battery are heated to place and maintain the electrode materials in the fluid state.

Thermal batteries have several advantages over other types of batteries. The relatively low cost, high energy density, and high power density of thermal batteries (high temperature batteries) make these types of batteries highly attractive for several uses. Unfortunately, the safety issues with these devices have constrained widespread adoption. Due to highly energetic chemistry, thermal batteries have suffered from dangerous risks of fire and explosion. Conventional thermal battery designs include two pools of fluid (i.e., molten) materials separated by a third material. If the third material fails and allows the molten materials to mix and react, an immense amount of thermal energy is released in a short period of time. These conditions often lead to a dangerous fire condition or explosion. This severe limitation still continues today although the demand for a safe thermal battery has existed since the inception of thermal batteries during World War II. Several decades of attempts have not resulted in an adequate solution to the problem. For example, some attempts include using a gravitational flow battery design in which one of the molten active materials is contained in a large reservoir located physically above a smaller reaction chamber where the walls of the reaction chamber are a solid electrolyte. On the other side of the solid electrolyte is a large reservoir of the other molten active material. In the event that the solid electrolyte fails and the two molten active materials are allowed to mix, the hope is that the solid products that are formed by the chemical reaction of the mixing of the two molten active materials will limit the flow of the active materials from the large reservoir located physically above with the other large reservoir of the other molten active material. The gravitational flow battery design attempt fails because the solid products that are intended to block the flow from the upper reservoir do not form an adequate barrier. Therefore, the mixing of the two molten active materials is only slowed by this design and is insufficient to prevent a thermal runaway event. Other attempts include changing the chemistry of the molten active materials to a metal halide chemistry such that a solid electrolyte failure does not cause a thermal runaway event. Unfortunately, this technique comes at the cost of decreasing the gravimetric energy density (kWh/kg) and the volumetric energy density (kWh/l) to a point where the thermal battery is no longer a viable solution for many applications.

Research in thermal batteries has even been abandoned by some due to the high danger. For example, a major auto manufacturer developed a fleet of electric vehicles that used thermal sodium-sulfur batteries in 1993. During the testing, two vehicles burst into flames while charging. As a result of these fires, the manufacturer ended its thermal sodium-sulfur battery program and the U.S. Department of Energy stopped funding of thermal battery research. This is despite the enormous advantages that a safe thermal battery would provide to the electric vehicle industry as well as other industries. The relative light weight and low cost of thermal batteries clearly make these devices the best choice for use in electric vehicles if the danger of fire is mitigated.

In accordance with the techniques discussed herein, the fire danger of a thermal battery is minimized by limiting the amount of fluid or molten material that is present at any one time in the battery. Only a portion of solid electrode material is heated to the fluid state. The remaining portion of non-fluid solid material is not at risk of combining and reacting if a structural failure occurs within the battery. The thermal energy released from a reaction of the fluid materials due to a breach in the solid electrolyte is minimized by limiting the amount of fluid material that is present in the reaction chamber, as well as limiting the amount of fluid material in the battery.

FIG. 1 is a block diagram of an example of a battery including a reaction chamber having fluid electrodes separated by a solid electrolyte where only selected portions of the electrode materials contained in the battery are heated to place and maintain the electrode materials in the fluid state. The illustration in FIG. 1 depicts the general principles of the example and does not necessarily represent specific shapes, relative sizes, distances, or other structural details of the represented components. In some circumstances, the structures of two or more blocks may be implemented in a single component or structure. In addition, functions described as performed in a single block of FIG. 1 may be implemented in separate structures.

As discussed herein, a material is in a fluid state when the material has a consistency sufficiently liquefied to allow the material to flow from one area to another. In other words, the viscosity of a fluid material is such that the material can be directed, pumped, or can otherwise flow from one area to another. A fluid material may, however, have some components that are at least partially solid while others are in a liquid phase. As a result, a fluid material is not necessarily all in a liquid phase. As discussed herein, a material is in a non-fluid state where it is sufficiently solidified such that it cannot flow. In other words, the viscosity of the material in a non-fluid state is such that the material cannot be directed, pumped, or otherwise allowed to flow from one area to another. A non-fluid material, however, may have some components that are in a liquid phase as well as others that are in a solid phase. When a material is in the fluid state, it is fluid and when a material is in the non-fluid state, it is non-fluid. For the examples discussed herein, the electrode materials are transitioned from a non-fluid state to a fluid state by heating and can be referred to as molten electrode materials and molten fluid electrode materials.

For the example, the battery 100 includes at least a reaction chamber 102, a plurality of negative electrode reservoirs 104, 106, 108, a plurality of positive electrode reservoirs 110, 112, 114 and a heating system 116. The heating system 116 heats at least one negative electrode reservoir and at least one positive electrode reservoir to maintain the materials contained within those selected reservoirs 104, 110 in a fluid state (i.e. molten fluid state). Therefore, the battery 100 includes negative electrode material 118 where some of the material is in a non-fluid state and some of the material is in a fluid state. As discussed herein, the total negative electrode material contained in the battery 100 is referred to as negative electrode material 118, the portion of total negative electrode material 118 that is in the non-fluid state and cannot flow is referred to as non-fluid negative electrode material 120, and the portion of total negative electrode material 118 that is in the fluid state and can flow is referred to as fluid negative electrode material 124. The battery 100 also includes positive electrode material 126 where some of the material 126 is in a non-fluid state and some of the material 126 is in a fluid state during operation. As discussed herein, the total positive electrode material contained in the battery is referred to as positive electrode material 126, the portion of positive electrode material 126 that is in the non-fluid state and cannot flow is referred to as non-fluid positive electrode material 128, and the portion of positive electrode material 126 that is in the fluid state and can flow is referred to as fluid positive electrode material 130.

The reaction chamber 102 includes a negative electrode region 132 and a positive electrode region 134 separated by a solid electrolyte 136. The plurality of negative electrode reservoirs 104, 106, 108 are connected to the negative electrode region 132 such that the negative electrode material contained in the reservoirs 104, 106, 108 can flow between the reservoir and the negative electrode region 132 when the negative electrode material is in a fluid state. The plurality of positive electrode reservoirs 110, 112, 114 are connected to the positive electrode region 134 such that the positive electrode material contained in the reservoirs 110, 112, 114 can flow between the reservoir and the positive electrode 134 region when the positive electrode material is in a fluid state. During operation of the battery 100, the negative electrode region 132 contains fluid negative electrode material 124 and the positive electrode region 134 contains fluid positive electrode material 130. As discussed below in further detail, the positive electrode region 134 may also contain some by-products resulting from the reaction within the battery 100. The fluid negative electrode material 124 in the negative electrode region 132 forms a fluid negative electrode 138 of the battery 100. The fluid positive electrode material 130 in the positive electrode region 134 forms a fluid positive electrode 140 of the battery 100. With properly placed current collectors (not shown in FIG. 1) within each electrode 138, 140 a reaction occurs within the battery between the fluid negative electrode 138 and the fluid positive electrode 140 through the solid electrolyte 136, and electrical energy can be harnessed from the electrochemical reaction. Therefore, the operation of the reaction chamber 102 in the example of FIG. 1 is similar to the operation of conventional thermal batteries. A significant advantage over conventional thermal batteries, however, includes limiting the amount of electrode material that is in the fluid state thereby minimizing the potential for fire during a structural failure. For example, the reaction chamber 102 can be configured to limit the amount of fluid negative electrode material within the negative electrode region 132 and the amount of fluid positive electrode material within the positive electrode region 134 available for an undesired chemical reaction if a breach in the solid electrolyte occurs. The amount of thermal energy generated by the direct chemical reaction of the fluid electrodes is directly portion to the amount of material of each fluid electrode in the reaction chamber 102 and directly proportional to the volume of the respective electrode regions 132, 134 of the reaction chamber 102. Therefore, an objective of one advantageous design includes minimizing the amount of fluid electrode material within the electrode regions 132, 134 by minimizing the volume of the electrode regions 132, 134 in the reaction chamber 102. The amount of thermal energy resulting from an undesired chemical reaction can also be minimized by limiting only one of the electrode regions because limiting one of the reactants in a chemical reaction limits the entire chemical reaction.

The heating system 116 includes several portions that allow for selectively heating selected reservoirs. For the example, the heating system 116 includes a plurality of negative material heating system portions 142, 144, 146 that are configured to independently heat each of selected reservoirs of the plurality of negative electrode reservoirs 104, 106, 108 and a plurality of positive material heating system portions 148, 150, 152 that are configured to independently heat each of selected reservoirs of the plurality of positive electrode reservoirs 110, 112, 114. The heating system 116 also includes a reaction chamber portion 154 that is configured to maintain the reaction chamber 102 at the operating temperature where the electrodes 138, 140 are in the fluid state. For the example of FIG. 1, the heating system 116 is an electrical heating system including several heating elements that facilitate the heating of selected reservoirs and maintaining the non-selected reservoirs at a temperature that is sufficiently low to maintain the electrode materials in the non-fluid state. Other types of heating systems 116 can be used in some circumstances.

For the specific situation shown in FIG. 1, a first negative electrode reservoir 104 and a first positive electrode reservoir 110 are heated by a first negative material heating system portion 142 and a first positive material heating system portion 148, respectively. Therefore, the selected reservoirs include the first negative electrode reservoir 104 and the first positive electrode reservoir 110 and the non-selected reservoirs include a second negative electrode reservoir 106, a third negative electrode reservoir 108 and a second positive electrode reservoir 112, and a third positive electrode reservoir 114. In FIG. 1, the negative heating system portions 144, 146 associated with the non-selected negative electrode reservoirs 106, 108 are illustrated with crosshatching while the negative heating system portion 142 associated with the selected negative electrode reservoir 104 is shown with a clear background to indicate that the negative heating system portion 142 is heating the selected negative electrode reservoir 104. Similarly, the positive heating system portions 150, 152 associated with the non-selected positive electrode reservoirs 112, 114 are illustrated with crosshatching while the positive heating system portion 148 associated with the selected positive electrode reservoir 110 is shown with a clear background to indicate that the positive heating system portion 148 is heating the selected positive electrode reservoir 110. The fluid positive electrode material 130 flows between the reservoir 110 and the positive electrode region 134 of the chamber 102. For the example discussed with reference to FIG. 1, only one of three negative electrode reservoirs and only one of three positive electrode reservoirs are heated to place and maintain the material in the selected reservoirs in the fluid state. Any number of reservoirs may be included and any number may be heated where the number of reservoirs heated to maintain the electrode material in the fluid state is less than the total number of reservoirs containing the particular electrode material. For example, in some situations the battery may include six positive electrode reservoirs and six negative electrode reservoirs where two of positive electrode reservoirs and two of the negative electrode reservoirs are heated sufficiently to place and maintain the material in those selected electrode reservoirs in the fluid state. In other situations, the battery may include a different number of positive electrode reservoirs than negative electrode reservoirs. A different number of positive electrode reservoirs may be heated than the number of negative electrode reservoirs that are heated. Further, in addition to the selected reservoirs that are heated sufficiently to place the material in those reservoirs in the fluid state, other reservoirs may be heated but kept at a temperature lower than the temperature where the material begins to melt and become fluid. Numerous configurations, sizes, and temperature schemes can be used to implement the battery 100. Therefore, the positive electrode reservoirs may have different size, number, shape, and temperature than the negative electrode reservoirs. Further, the size and shape of each of the positive electrode reservoirs may be same as other positive electrode reservoirs or may vary and the size and shape of each of the negative electrode reservoirs may be same as negative electrode reservoirs.

The battery 100 may be implemented with different materials and electrochemical couples. For the example discussed below with reference to FIG. 2A, the negative electrode comprises lithium (Li) and the positive electrode comprises sulfur (S). In another example discussed with reference to FIG. 2B, a sodium-sulfur (NaS) battery includes a fluid negative electrode comprising sodium (Na) and a fluid positive electrode comprising sulfur (S). In addition, other materials may also be used for the electrodes. Further, the electrode materials may contain mixtures or compounds that include multiple elements in some circumstances. For example, in some LiS batteries, a molten mixture of sulfur and phosphorus can be used for the fluid negative electrode.

The operating temperature, or temperature ranges, of the reservoirs, negative electrode region, and positive electrode region may be selected based on several factors including, for example, the melting point of the negative electrode material, the melting point of the positive electrode material, the boiling point of the negative electrode material, the boiling point of the positive electrode material, the eutectic point of the positive electrode material and resulting chemical species, and the melting point of the solid electrolyte. For the examples discussed herein, the heating system 116 maintains the selected reservoirs and the reaction chamber 102 at the same temperature. In some situations, however, the selected reservoirs and the reaction chamber may be maintained at different temperatures. For example, the selected negative reservoir may be maintained at a temperature above, but somewhat near, the melting point of the negative electrode material, the selected positive reservoir may be maintained at a temperature above, but somewhat near, the melting point of the positive electrode material and the temperature of the reaction chamber may be maintained at a temperature above the melting points of both electrode materials. Typically, the temperature of positive electrode region 134 is maintained at the same temperature as the negative electrode region 132 in order to avoid a temperature gradient across the solid electrolyte 136. In some situations, however, the temperatures may be different.

Figure 2A:
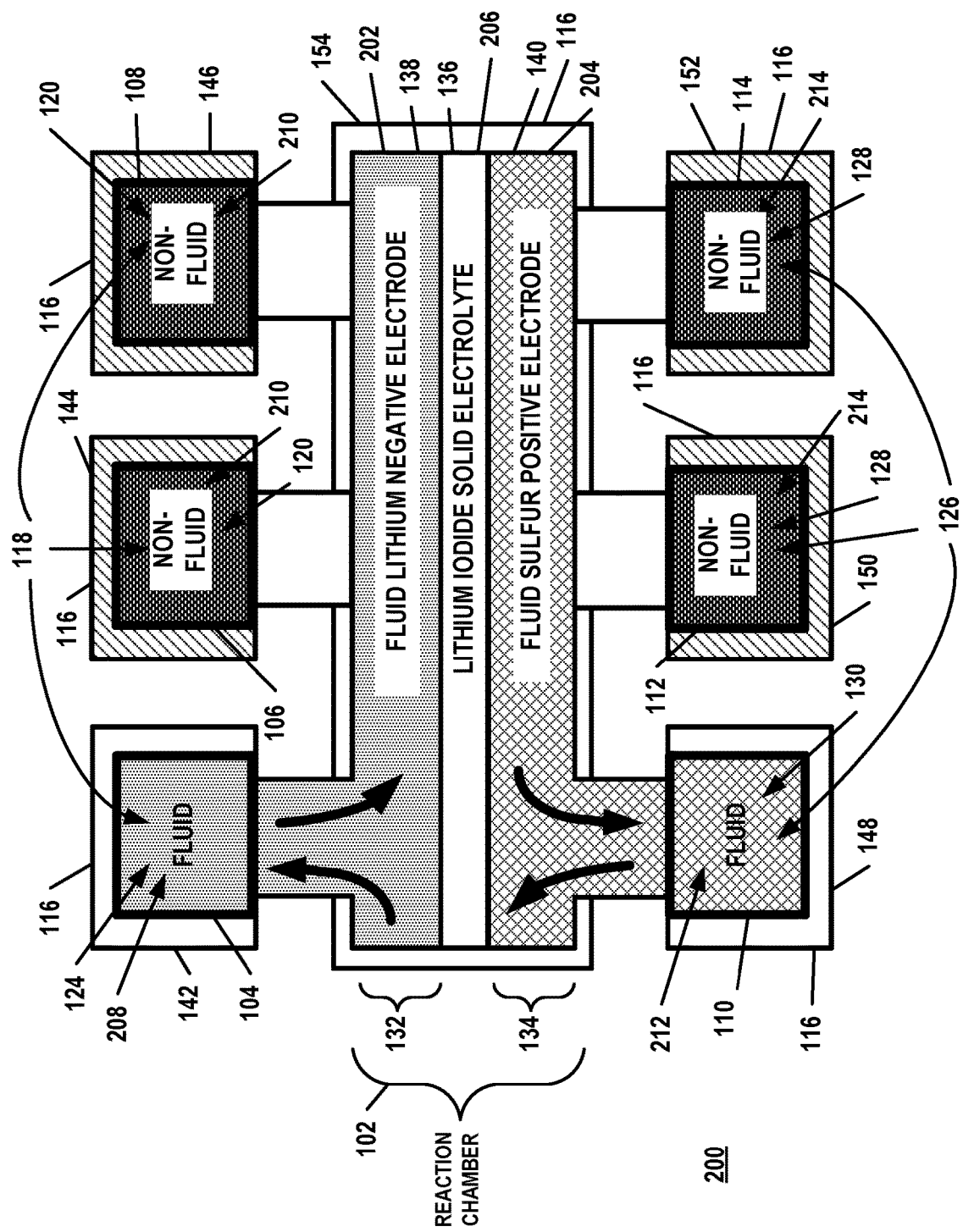
FIG. 2A is a block diagram of an example of a battery including a fluid lithium (Li) negative electrode, a fluid sulfur (S) positive electrode, and lithium iodide (LiI) solid electrolyte.

FIG. 2A is a block diagram of an example of battery 200 including a fluid lithium (Li) negative electrode 202 and a fluid sulfur (S) positive electrode 204 separated by a lithium iodide (LiI) solid electrolyte 206. Accordingly, the battery 200 can be referred to as a lithium-sulfur (LiS) battery and is an example of the battery 100 where the fluid negative electrode 138 comprises lithium and the fluid positive electrode 140 comprises sulfur. The illustration in FIG. 2A depicts the general principles of the example and does not necessarily represent specific shapes, relative sizes, distances, or other structural details of the represented components. In some circumstances, the structures of two or more blocks may be implemented in a single component or structure. In addition, functions described as performed in a single block of FIG. 2A may be implemented in separate structures.

The operation of the LiS battery 200 is in accordance with operation described with reference to the battery 100 of FIG. 1. The negative electrode reservoirs 104, 106, 108 contain negative electrode material that comprises lithium where at least one reservoir 104 is heated to place and maintain the lithium 208 in a fluid state allowing it to flow into the negative electrode region 132 of the reaction chamber 102. The lithium 210 in the other, non-selected negative electrode reservoirs is maintained in the non-fluid state and does not flow to the chamber 102. The positive electrode reservoirs 110, 112, 114 contain positive electrode material that comprises sulfur where at least one reservoir 110 is heated to place and maintain the sulfur 212 in a fluid state allowing it to flow into the positive electrode region 134 of the reaction chamber 102. The sulfur 214 in the other, non-selected negative electrode reservoirs is maintained in the non-fluid state and does not flow to the chamber 102. Therefore, for the example of FIG. 2A, the negative electrode material 118 comprises lithium and the positive electrode material 126 comprises sulfur.

The heating system 116 heats the selected reservoirs 104, 110 to place and maintain the lithium and sulfur in the fluid state while maintaining the lithium and sulfur within the non-selected reservoirs 106, 108, 112, 114 in the non-fluid state. The heating system 116 also maintains the reaction chamber 102 at the appropriate temperature to facilitate the desired reaction between the sulfur and lithium through the lithium iodide electrolyte. For the example of FIG. 2A, the temperature of the selected negative electrode reservoir 104 and the selected positive electrode reservoir 110 is maintained at a temperature around 400 degrees Celsius (° C.). As discussed above, the operating temperature may be based on several factors including the characteristics of the materials of the electrodes and solid electrolyte. For the example of FIG. 2A, some of the characteristics that can be considered include the melting point of lithium iodide, 469° C., the boiling point of sulfur, 444.6° C., and the eutectic melting point of lithium polysulfide products ($Li_nS_m$), 365° C. A temperature range that is above the eutectic melting point of lithium polysulfide products but below the melting point of LiI provides the temperature range of 365° C. to 469° C. that can be used in some circumstances. Maintaining the temperature below the boiling point of sulfur may be useful and provide a range of 365° C. to 444° C. that can be used in other circumstances. A suitable temperature range, however, includes temperatures between 375° C. and 425° C. The wider temperature range of 115.21° C. to 469° C. can also be used in still other situations. For the examples herein, the temperatures of selected negative electrode reservoir 104, the selected positive electrode reservoir 110, the negative electrode region 132 and the positive electrode region 134 are maintained at approximately the same temperature. Among other advantages, such a scheme avoids a temperature gradient across the solid electrolyte. In some situations, however, the temperatures may be different between the different selected reservoirs and electrode regions. Other temperature ranges and schemes can be used as long as the selected portions of electrode materials can flow to the reaction chamber. As a result, the selected positive reservoir 110 and the positive electrode region 134 should be above the melting point of sulfur, 115.21° C., and the selected negative reservoir 104 and the negative electrode region 134 should be above the melting point of lithium, 180.5° C.

During operation of the battery 200, the reaction may result in other compounds or products being formed. For example, in addition to the positive electrode region containing sulfur, the region may also contain di-lithium polysulfide species ($Li_2S_n$ where n is two or higher) and di-lithium sulfide ($Li_2S$). Typically, the reaction through the electrolyte will result is several different chemical species such as $Li_2S_m$ where m is an integer equal to one or more. Any number of chemical species may result and may include, for example $Li_2S$, $Li_2S_2$, $Li_2S_4$, and $Li_2S_6$ products as well as others in some circumstances.

In some situations, additional materials may be added to the positive electrode material and/or to the negative electrode material. For example, phosphorus can be included in the positive electrode material resulting in a fluid phosphorus-sulfur positive electrode. Therefore, another example of the fluid electrode battery 100 includes a lithium phosphorus-sulfur (LiPS) battery. Therefore, in one example, the positive electrode material comprises sulfur and, in another example, the positive electrode material comprises sulfur and phosphorous. Examples of suitable temperature ranges for the reservoirs and reaction chamber for a Li PS battery include the ranges discussed above with reference to the LiS battery 200 of FIG. 2A.

Figure 2B:
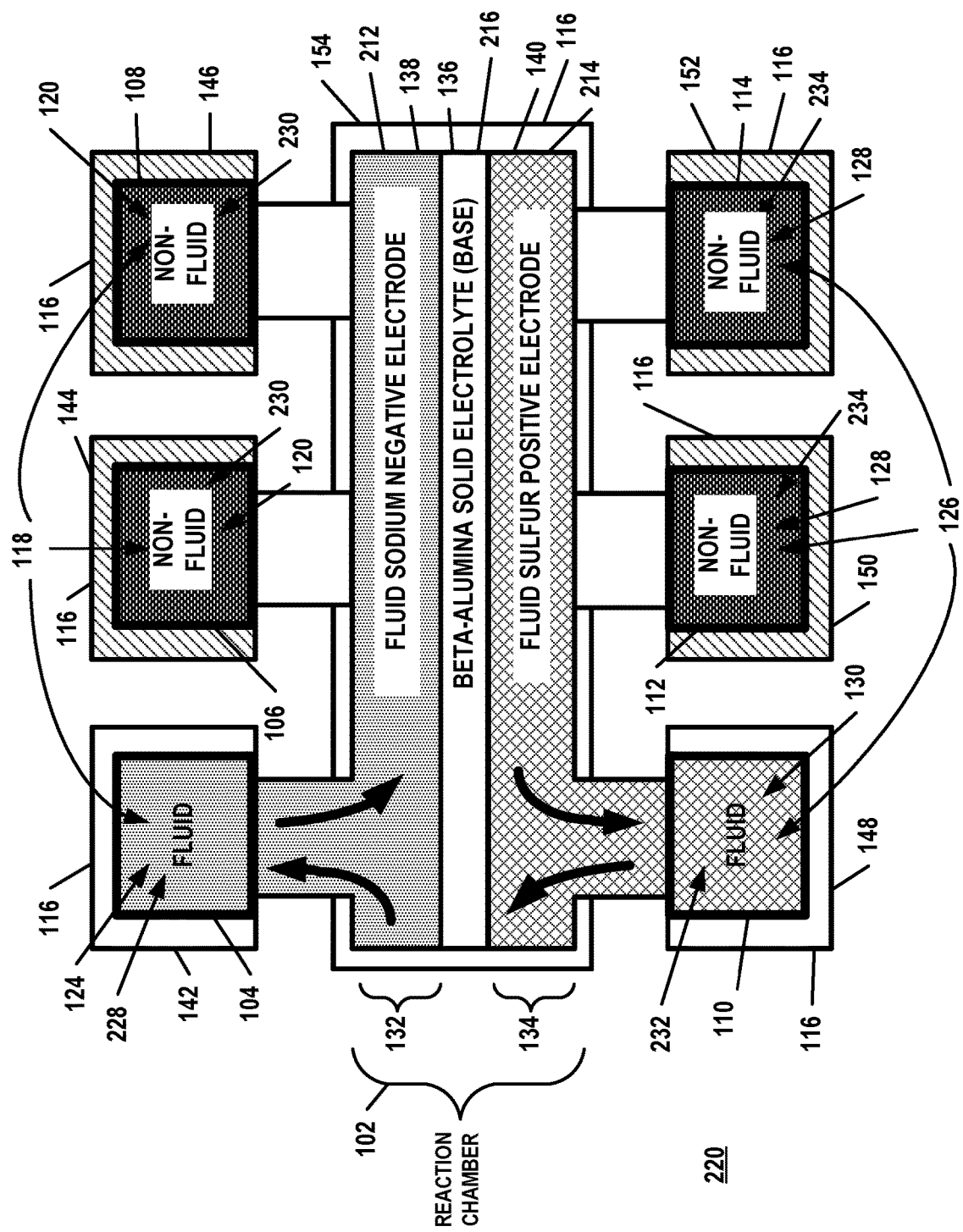
FIG. 2B is a block diagram of an example of a battery including a fluid sodium negative electrode, a fluid sulfur positive electrode, and a beta-alumina solid electrolyte (BASE).

FIG. 2B is a block diagram of an example of a battery 220 including a fluid sodium (Na) negative electrode 212 and a fluid sulfur (S) positive electrode 214 separated by a beta-alumina solid electrolyte (BASE) 216. Accordingly, the battery 220 can be referred to a sodium-sulfur (NaS) battery and is an example of the battery 100 where the fluid negative electrode 138 comprises sodium and the fluid positive electrode 140 comprises sulfur. The illustration in FIG. 2B depicts the general principles of the example and does not necessarily represent specific shapes, relative sizes, distances, or other structural details of the represented components. In some circumstances, the structures of two or more blocks may be implemented in a single component or structure. In addition, functions described as performed in a single block of FIG. 2B may be implemented in separate structures.

The operation of the NaS battery 220 is in accordance with operation described with reference to the battery 100 of FIG. 1. The negative electrode reservoirs 104, 106, 108 contain negative electrode material that comprises sodium where at least one reservoir 104 is heated to place and maintain the sodium 228 in a fluid state allowing it to flow into the negative electrode region 132 of the reaction chamber 102. The sodium 230 in the other, non-selected negative electrode reservoirs is maintained in the non-fluid state and does not flow to the chamber 102. The positive electrode reservoirs 110, 112, 114 contain positive electrode material that comprises sulfur where at least one reservoir 110 is heated to place and maintain the sulfur 232 in a fluid state allowing it to flow into the positive electrode region 134 of the reaction chamber 102. The sulfur 234 in the other, non-selected negative electrode reservoirs is maintained in the non-fluid state and does not flow to the chamber 102. Therefore, for the example of FIG. 2B, the negative electrode material 118 comprises sodium and the positive electrode material 126 comprises sulfur.

The heating system 116 heats the selected reservoirs 104, 110 to place and maintain the sodium and sulfur in the fluid state while maintaining the sodium and sulfur within the non-selected reservoirs 106, 108, 112, 114 in the non-fluid state. The heating system 116 also maintains the reaction chamber 102 at the appropriate temperature to facilitate the desired reaction between the sulfur and sodium through the beta-alumina solid electrolyte 216. For the example of FIG. 2B, the temperature of the selected negative electrode reservoir 104 and the selected positive electrode reservoir 110 is maintained at a temperature around 300 degrees Celsius (° C.). As discussed above, the operating temperature may be based on several factors including the characteristics of the materials of the electrodes and solid electrolyte. For the example of FIG. 2B, some of the characteristics that can be considered include the boiling point of sulfur, 444.6° C., and the eutectic melting point of sodium polysulfide products ($Na_2S_4$), 225° C. A temperature range that is above the eutectic melting point of sodium polysulfide products but below the boiling point of sulfur provides the temperature range of 225° C. to 444.6° C. that can be used in some circumstances. A suitable temperature range, however, includes temperatures between 250° C. and 350° C. The wider temperature range of 97.8° C. to 444.6° C. may also be used in still other situations. For the examples herein, the temperatures of selected negative electrode reservoir 104, the selected positive electrode reservoir 110, the negative electrode region 132 and the positive electrode region 134 are maintained at approximately the same temperature. Among other advantages, such a scheme avoids a temperature gradient across the solid electrolyte. In some situations, however, the temperatures may be different between the different selected reservoirs and electrode regions. The particular temperature ranges and temperature scheme is at least partially based on the melting points and boiling points of the positive electrode material, negative electrode material, and the solid electrolyte as well as any changes to the melting points and the boiling points of the materials during operation of the battery. As discussed above, in some situations, the temperature of the reaction chamber may be selected based on the potential chemical species resulting in the positive electrode region in the reaction chamber during operation. Other temperature ranges and schemes can be used as long as the selected portions of electrode materials can flow to the reaction chamber. As a result, the selected positive reservoir 110 and the positive electrode region 134 should be above the melting point of sulfur, 115.21° C., and the selected negative reservoir 104 and the negative electrode region 132 should be above the melting point of sodium, 97.8° C.

Figure 2C:
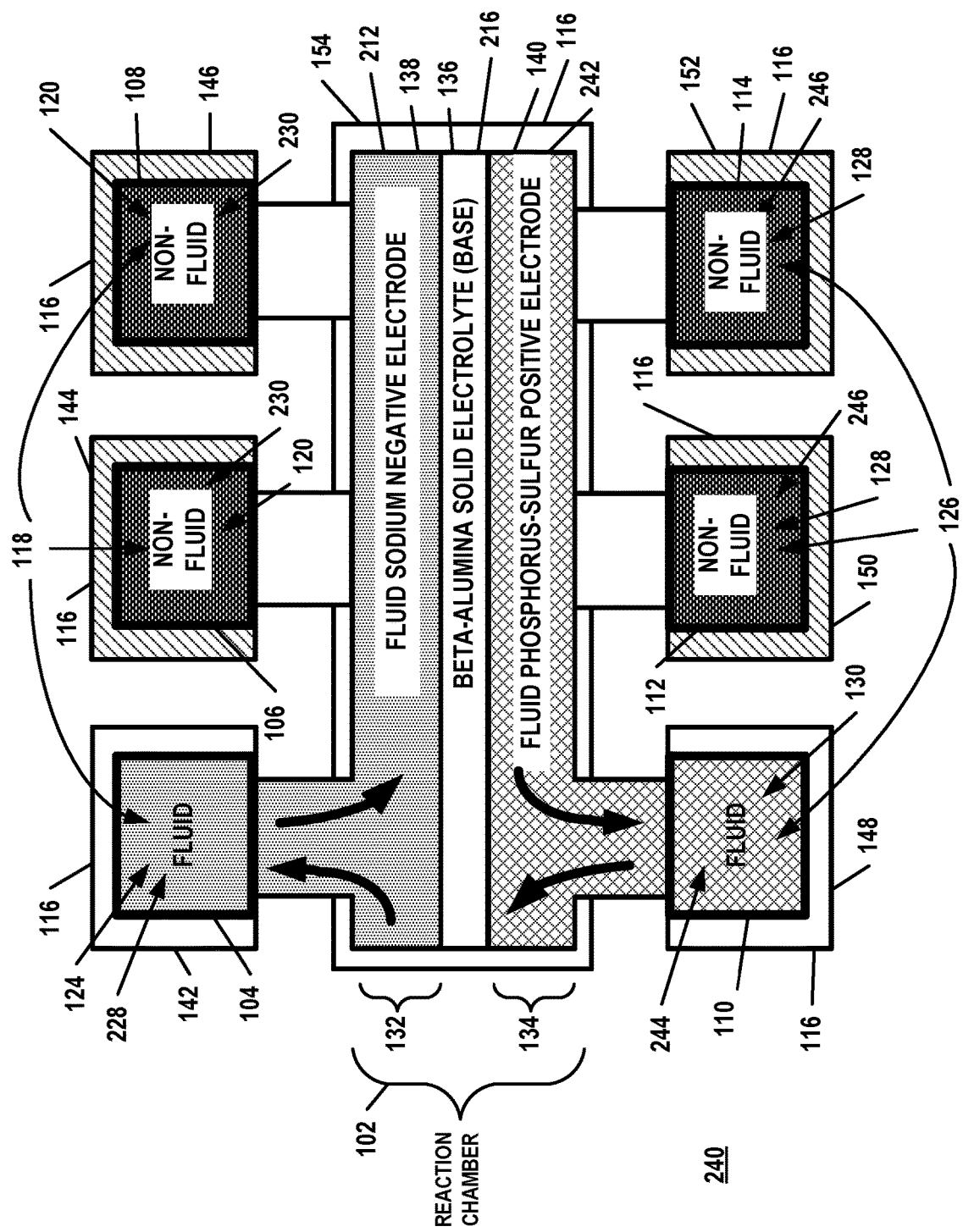
FIG. 2C is a block diagram of an example of a battery including a fluid sodium (Na) negative electrode and a fluid phosphorous-sulfur (PS) positive electrode separated by a beta-alumina solid electrolyte (BASE).

FIG. 2C is a block diagram of an example of a battery 240 including a fluid sodium (Na) negative electrode 212 and a fluid phosphorous-sulfur (PS) positive electrode 242 separated by a beta-alumina solid electrolyte (BASE) 216. Accordingly, the battery 240 can be referred to as a sodium-phosphorus-sulfur (NaPS) battery and is an example of the battery 100 where the fluid negative electrode 138 comprises sodium and the fluid positive electrode 140 comprises phosphorous and sulfur. The illustration in FIG. 2C depicts the general principles of the example and does not necessarily represent specific shapes, relative sizes, distances, or other structural details of the represented components. In some circumstances, the structures of two or more blocks may be implemented in a single component or structure. In addition, functions described as performed in a single block of FIG. 2C may be implemented in separate structures.

The operation of the NaPS battery 240 is in accordance with operation described with reference to the battery 100 of FIG. 1. The negative electrode reservoirs 104, 106, 108 contain negative electrode material that comprises sodium where at least one reservoir 104 is heated to place and maintain the sodium 228 in a fluid state allowing it to flow into the negative electrode region 132 of the reaction chamber 102. The sodium 230 in the other, non-selected negative electrode reservoirs is maintained in the non-fluid state and does not flow to the chamber 102. The positive electrode reservoirs 110, 112, 114 contain positive electrode material that comprises phosphorous-sulfur where at least one reservoir 110 is heated to place and maintain the phosphorous-sulfur 244 in a fluid state allowing it to flow into the positive electrode region 134 of the reaction chamber 102. The phosphorous-sulfur 246 in the other, non-selected negative electrode reservoirs is maintained in the non-fluid state and does not flow to the chamber 102. Therefore, for the example of FIG. 2C, the negative electrode material 118 comprises sodium and the positive electrode material 126 comprises sulfur and phosphorous.

The heating system 116 heats the selected reservoirs 104, 110 to place and maintain the sodium and sulfur in the fluid state while maintaining the sodium and phosphorous-sulfur within the non-selected reservoirs 106, 108, 112, 114 in the non-fluid state. The heating system 116 also maintains the reaction chamber 102 at the appropriate temperature to facilitate the desired reaction between the sulfur and sodium through the beta-alumina solid electrolyte 216. As discussed above, the operating temperature may be based on several factors including the characteristics of the materials of the electrodes and solid electrolyte. For the example of FIG. 2C, the temperature of the selected negative electrode reservoir 104 and the selected positive electrode reservoir 110 is maintained at a temperature around 300 degrees Celsius (° C.). For the example of FIG. 2C, some of the characteristics that can be considered include the boiling point of sulfur, 444.6° C., and the eutectic melting point of sodium polysulfide products ($Na_2S_4$), 225° C., and the boiling point of phosphorus pentasulfide (i.e., $P_2S_5$ or $P_4S_{10}$) 514° C. A temperature range that is above the eutectic melting point of sodium polysulfide products but below the boiling point of phosphorus pentasulfide (i.e., $P_2S_5$ or $P_4S_{10}$) provides the temperature range of 225° C. to 514° C. that can be used in some circumstances. A suitable temperature range, however, includes temperatures between 250° C. and 350° C. In some circumstances, the temperature may be within a range of 225° C. to 444° C. The temperature may also range from 225° C. to 514° C. in other examples. In other situations, the temperature may be within a range of 97° C. to 514° C. For the examples herein, the temperatures of selected negative electrode reservoir 104, the selected positive electrode reservoir 110, the negative electrode region 132 and the positive electrode region 134 are maintained at approximately the same temperature. Among other advantages, such a scheme avoids a temperature gradient across the solid electrolyte. In some situations, however, the temperatures may be different between the different selected reservoirs and electrode regions. The particular temperature ranges and temperature scheme is at least partially based on the melting points and boiling points of the positive electrode material, negative electrode material, and the solid electrolyte as well as any changes to the melting points and the boiling points of the materials during operation of the battery. For example, in some situations, the temperature of the reaction chamber may be selected based on the potential chemical species resulting in the positive electrode region in the reaction chamber during operation.

Figure 3:
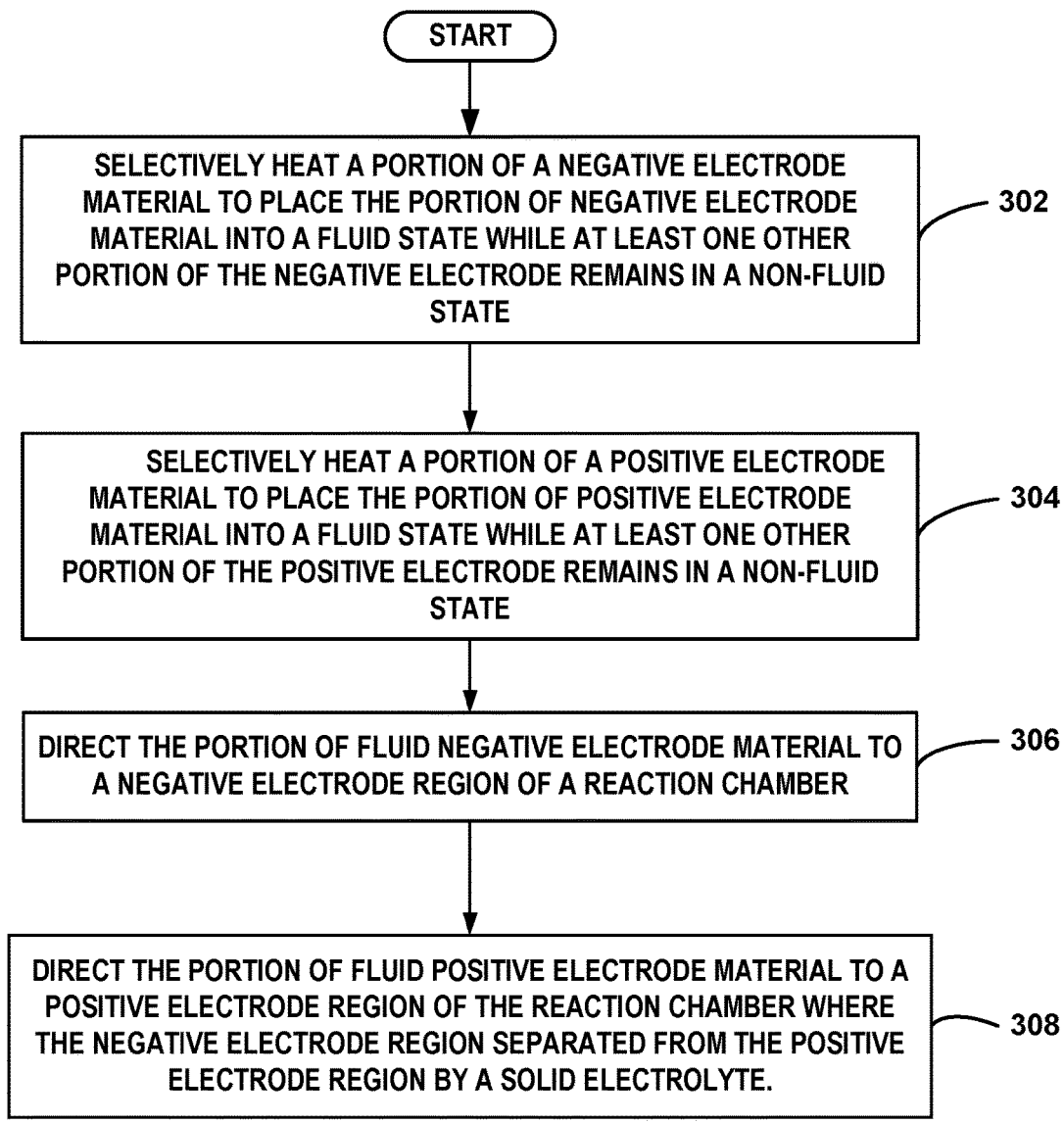
FIG. 3 is a flowchart of an example of a method of operating a fluid electrode battery.

FIG. 3 is a flowchart of an example of a method of operating a fluid electrode battery. The steps of FIG. 3 can be performed in a different order than shown and some steps may be combined into a single step. Additional steps may be performed and some steps may be omitted. For example, the step 302 and step 304 are performed simultaneously in many circumstances. Similarly, step 306 and step 308 are performed simultaneously in many circumstances.

At step 302, a portion of negative electrode material is selectively heated to place and maintain the portion of negative electrode material into a fluid state while at least one other portion of the negative electrode remains in a non-fluid state. For example, the negative electrode material may be distributed between a plurality of negative electrode reservoirs such that a heating system can heat a selected reservoir to melt the material contained in the reservoir and maintain it in a fluid state (i.e., molten fluid state). One or more other portions of the negative electrode material is maintained in the non-fluid state within the other negative electrode reservoirs by keeping the temperature for those non-selected reservoirs below the melting point of the negative electrode material.

At step 304, a portion of positive electrode material is selectively heated to place and maintain the portion of positive electrode material into a fluid state (i.e., molten fluid state) while at least one other portion of the positive electrode remains in a non-fluid state. For example, the positive electrode material may be distributed between a plurality of positive electrode reservoirs such that the heating system can heat a selected reservoir to melt the material contained in the reservoir and maintain it in a fluid state. One or more other portions of the positive electrode material is maintained in the non-fluid state within the other positive electrode reservoirs by keeping the temperature for those non-selected reservoirs sufficiently cool so the positive electrode material does not flow.

At step 306, the portion of fluid negative electrode material is directed to a negative electrode region of a reaction chamber. For example, the fluid negative electrode material can be allowed to flow into the negative electrode region of a reaction chamber.

At step 308, the portion of fluid positive electrode material is directed to a positive electrode region of the reaction chamber. The negative electrode region is separated from the positive electrode region by a solid electrolyte. For example, the fluid positive electrode material can be allowed to flow into the positive electrode region of a reaction chamber that is separated from the negative electrode region by the solid electrolyte.

It should be understood that, depending on the example, certain acts or events of any of the methods described herein can be performed in a different sequence, may be added, merged, or left out altogether (e.g., not all described acts or events are necessary for the practice of the method). Moreover, in certain examples, acts or events may be performed concurrently, rather than sequentially or even reversed. In addition, while certain aspects of this disclosure are described as being performed by a single module or component for purposes of clarity, it should be understood that the functions described in this disclosure may be performed by any suitable combination of components.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

What is claimed is:

1. A thermal battery comprising:
   a plurality of negative electrode reservoirs configured to contain a negative electrode material;
   a plurality of positive electrode reservoirs configured to contain a positive electrode material;
   a heating system configured to heat negative electrode material within a selected negative electrode reservoir of the plurality of negative electrode reservoirs to maintain the negative electrode material contained in the selected negative electrode reservoir in a fluid state and configured to heat positive electrode material in a selected positive electrode reservoir to maintain the positive electrode material contained in the selected positive electrode reservoir in the fluid state while maintaining, in a non-fluid state, negative electrode material in a non-selected negative electrode reservoir and positive electrode material in a non-selected positive electrode reservoir;
   a reaction chamber connected to the plurality of negative electrode reservoirs and to the plurality of positive electrode reservoirs, the reaction chamber comprising a solid electrolyte positioned in the reaction chamber to form a positive electrode region on a first side of the solid electrolyte and to form a negative electrode region on a second side of the solid electrolyte, the reaction chamber configured to receive fluid negative electrode material in the negative electrode region from the selected negative electrode reservoir and to receive fluid positive electrode material in the positive electrode region from the selected positive electrode reservoir.

2. The thermal battery of claim 1, wherein the second side is opposite the first side.

3. The thermal battery of claim 1, wherein the negative electrode material comprises lithium (Li), the positive electrode material comprises sulfur (S), and the solid electrolyte comprises lithium ions (Li$^+$).

4. The thermal battery of claim 3 wherein the solid electrolyte comprises lithium iodide (LiI).

5. The thermal battery of claim 3, wherein the positive electrode material comprises phosphorous (P).

6. The apparatus of claim 1, wherein the negative electrode material comprises sodium (Na), the positive electrode material comprises sulfur (S), and the solid electrolyte comprises sodium ions.

7. The apparatus of claim 6, wherein the solid electrolyte comprises beta-alumina solid electrolyte (BASE).

8. The apparatus of claim 6, wherein the solid electrolyte comprises beta" alumina solid electrolyte.

9. The apparatus of claim 6, wherein the positive electrode material comprises phosphorous (P).

10. The thermal battery of claim 1, wherein the heating system is configured to heat the selected positive electrode reservoir to maintain the temperature of the positive electrode material within the selected positive electrode reservoir between 115° C. and 469° C. and to heat the selected negative electrode reservoir to maintain the temperature of the negative electrode material within the selected negative electrode reservoir between 97° C. and 469° C.

11. The thermal battery of claim 10, wherein the heating system is configured to heat the selected positive electrode reservoir to maintain the temperature of the positive electrode material within the selected positive electrode reservoir between 220° C. and 469° C. and to heat the selected negative electrode reservoir to maintain the temperature of the negative electrode material within the selected negative electrode reservoir between 220° C. and 469° C.

12. The thermal battery of claim 11, wherein the heating system is configured to heat the selected positive electrode reservoir to maintain the temperature of the positive electrode material within the selected positive electrode reservoir between 250° C. and 444° C. and to heat the selected negative electrode reservoir to maintain the temperature of the negative electrode material within the selected negative electrode reservoir between 250° C. and 444° C.

13. The thermal battery of claim 12, wherein the heating system is configured to heat the selected positive electrode reservoir to maintain the temperature of the positive electrode material within the selected positive electrode reservoir between 300° C. and 425° C. and to heat the selected negative electrode reservoir to maintain the temperature of the negative electrode material within the selected negative electrode reservoir between 300° C. and 425° C.

14. The thermal battery of claim 13, wherein the heating system is configured to heat the selected positive electrode reservoir to maintain the temperature of the positive electrode material within the selected positive electrode reservoir at approximately 400° C. and to heat the selected negative electrode reservoir to maintain the temperature of the negative electrode material within the selected negative electrode reservoir at approximately 400° C.

15. A thermal battery comprising:
a negative electrode material comprising a portion of negative electrode material in a fluid state and a portion of negative electrode material in a non-fluid state, the portion of negative electrode material in the fluid state and the portion of negative electrode material in the non-fluid state present within a united structure forming the thermal battery at the same time during operation of the thermal battery;
a positive electrode material comprising a portion of positive electrode material in the fluid state and a portion of positive electrode material in the non-fluid state, the portion of positive electrode material in the fluid state and the portion of positive electrode material in the non-fluid state present within the united structure forming the thermal battery at the same time during operation of the thermal battery; and
a reaction chamber comprising a solid electrolyte positioned in the reaction chamber to form a positive electrode region on a first side of the solid electrolyte and to form a negative electrode region on a second side of the solid electrolyte, the positive electrode region containing at least some of the portion of positive electrode material in the fluid state, the negative electrode region containing at least some of the portion of negative electrode material in the fluid state.

16. The thermal battery of claim 1, wherein the plurality of negative electrode reservoirs are connected to the negative electrode region such that the negative electrode material contained in each of the plurality of negative electrode reservoirs can flow between each of the plurality of negative electrode reservoirs and the negative electrode region when the negative electrode material in each of the plurality of negative electrode reservoirs is in a fluid state.

17. The thermal battery of claim 1, wherein the plurality of positive electrode reservoirs are connected to the positive electrode region such that the negative electrode material contained in each of the plurality of positive electrode reservoirs can flow between each of the plurality of positive electrode reservoirs and the positive electrode region when the positive electrode material in each of the plurality of positive electrode reservoirs is in a fluid state.

18. A thermal battery comprising:
a plurality of negative electrode reservoirs configured to contain a negative electrode material;
at least one positive electrode reservoir configured to contain a positive electrode material;
a heating system configured to heat negative electrode material within a selected negative electrode reservoir of the plurality of negative electrode reservoirs to maintain the negative electrode material contained in the selected negative electrode reservoir in a fluid state and configured to heat positive electrode material in the at least one positive electrode reservoir to maintain the positive electrode material contained in the at least one positive electrode reservoir in the fluid state while maintaining, in a non-fluid state, negative electrode material in a non-selected negative electrode reservoir;
a reaction chamber connected to the plurality of negative electrode reservoirs and to the at least one positive electrode reservoir, the reaction chamber comprising a solid electrolyte positioned in the reaction chamber to form a positive electrode region on a first side of the solid electrolyte and to form a negative electrode region on a second side of the solid electrolyte, the reaction chamber configured to receive fluid negative electrode material in the negative electrode region from the selected negative electrode reservoir and to receive fluid positive electrode material in the positive electrode region from the at least one positive electrode reservoir.

19. The thermal battery of claim 18, wherein the second side is opposite the first side.

20. The thermal battery of claim 18, wherein the negative electrode material comprises lithium (Li), the positive electrode material comprises sulfur (S), and the solid electrolyte comprises lithium ions (Li$^+$).

21. The thermal battery of claim 20 wherein the solid electrolyte comprises lithium iodide (LiI).

22. The thermal battery of claim 20, wherein:
the at least one positive electrode reservoir comprises a plurality of positive electrode reservoirs configured to contain a positive electrode material;
the heating system is further configured to heat positive electrode material in a selected positive electrode reservoir of the plurality of positive electrode reservoirs to maintain the positive electrode material contained in the selected positive electrode reservoir in the fluid state while maintaining, in a non-fluid state, positive electrode material in a non-selected positive electrode reservoir; and
the reaction chamber is connected to the plurality of positive electrode reservoirs and is configured to receive fluid positive electrode material in the positive electrode region from the selected positive electrode reservoir.

23. A thermal battery comprising:
a plurality of positive electrode reservoirs configured to contain a positive electrode material;
at least one negative electrode reservoir configured to contain a negative electrode material;
a heating system configured to heat negative electrode material within the at least one negative electrode reservoir to maintain the negative electrode material contained in the at least one negative electrode reservoir in a fluid state and configured to heat positive electrode material in a selected positive electrode reservoir to maintain the positive electrode material contained in the selected positive electrode reservoir in the fluid state while maintaining, in a non-fluid state, positive electrode material in a non-selected positive electrode reservoir;
a reaction chamber connected to the at least one negative electrode reservoir and to the plurality of positive electrode reservoirs, the reaction chamber comprising a solid electrolyte positioned in the reaction chamber to form a positive electrode region on a first side of the solid electrolyte and to form a negative electrode region on a second side of the solid electrolyte, the reaction chamber configured to receive fluid negative electrode material in the negative electrode region from the at least one negative electrode reservoir and to receive fluid positive electrode material in the positive electrode region from the selected positive electrode reservoir.

24. The thermal battery of claim 23, wherein the second side is opposite the first side.

25. The thermal battery of claim 23, wherein the negative electrode material comprises lithium (Li), the positive electrode material comprises sulfur (S), and the solid electrolyte comprises lithium ions (Li$^+$).

26. The thermal battery of claim 25 wherein the solid electrolyte comprises lithium iodide (LiI).

27. The thermal battery of claim 25, wherein the positive electrode material comprises phosphorous (P).

28. The thermal battery of claim 23, wherein:
- the at least one negative electrode reservoir comprises a plurality of negative electrode reservoirs configured to contain a negative electrode material;
- the heating system is further configured to heat negative electrode material in a selected negative electrode reservoir of the plurality of negative electrode reservoirs to maintain the negative electrode material contained in the selected negative electrode reservoir in the fluid state while maintaining, in a non-fluid state, negative electrode material in a non-selected negative electrode reservoir; and
- the reaction chamber is connected to the plurality of negative electrode reservoirs and is configured to receive fluid negative electrode material in the negative electrode region from the selected negative electrode reservoir.

* * * * *